United States Patent [19]

Howard-Leicester

[11] 4,382,173

[45] May 3, 1983

[54] SYSTEM FOR AUTOMATICALLY REGULATING WATER CONDUCTIVITY IN AN ELECTRODE-TYPE HUMIDIFIER EVAPORATOR

[76] Inventor: Michael Howard-Leicester, Edelweiss Valley, c/o General Delivery, Wilson's Corners, Quebec, Canada

[21] Appl. No.: 166,117

[22] Filed: Jul. 7, 1980

Related U.S. Application Data

[63] Continuation of Ser. No. 919,307, Jun. 26, 1978, abandoned.

[51] Int. Cl.³ .................... H05B 3/60; H05B 3/02; F22B 1/30
[52] U.S. Cl. .................................. 219/295; 122/379; 122/382; 219/273; 219/286; 261/142
[58] Field of Search ................. 219/271–276, 219/284–295; 122/379, 382; 261/142

[56] References Cited

U.S. PATENT DOCUMENTS

| | | | |
|---|---|---|---|
| 2,453,210 | 11/1948 | Eaton | 219/286 |
| 2,612,593 | 9/1952 | Mittendorf et al. | 219/287 |
| 3,269,364 | 8/1966 | Higgins | 219/295 X |
| 3,680,531 | 8/1972 | Holdt | 219/273 X |
| 3,761,679 | 9/1973 | Dall | 219/286 X |
| 3,944,785 | 3/1976 | Eaton-Williams | 219/295 X |

FOREIGN PATENT DOCUMENTS

| | | | |
|---|---|---|---|
| 2011638 | 3/1970 | France | 219/295 |
| 1327215 | 8/1973 | United Kingdom | 219/295 |

Primary Examiner—A. Bartis
Attorney, Agent, or Firm—Wenderoth, Lind & Ponack

[57] ABSTRACT

In a humidifier, an evaporator has a vessel containing two or more spaced vertical electrodes across which a voltage can be applied. The current which flows depends on the cross-section of the immersed portion of the electrodes, the size, shape and spacing of the electrodes, the applied voltage and conductivity and volume of the water. The invention provides a probe for measuring the conductivity of the water in the vessel and replacing some of the water in the vessel with fresh water when necessary to reduce the conductivity to the value for which the evaporator is designed. The probe may be connected directly into the evaporator or it may be connected to a voltage source so that a current dependent on the water conductivity will flow between these electrodes. This current can be compared in a comparator with a reference value and, if the reference value is exceeded, an RC timing circuit causes energization of an outlet solenoid valve for a time dependent directly on the extent to which the measured conductivity exceeds the reference. A timer causes the probe to measure the conductivity at preset intervals.

11 Claims, 2 Drawing Figures

SYSTEM FOR AUTOMATICALLY REGULATING WATER CONDUCTIVITY IN AN ELECTRODE-TYPE HUMIDIFIER EVAPORATOR

This is a continuation of application Ser. No. 919,307, filed June 26, 1978, now abandoned.

BACKGROUND OF THE INVENTION

This invention relates to humidifiers and more particularly to the evaporator portion of a humidifier.

Humidifiers incorporating evaporators in which a current is passed between spaced electrodes in water-carrying vessel are well-known. The current causes heating of the water and subsequently generation of steam which is passed into the air space, the moisture content of which is to be controlled.

The magnitude of the current and hence the steam generating ability is dependent on the voltage applied to the electrodes, the size, shape and spacing of the electrodes, the depth of immersion of the electrodes and the conductivity and volume of the water. A serious problem which has been recognized is that the conductivity of a water supply can vary by as much as 10:1 depending on the geological conditions of the source and also the conductivity of a particular water supply can vary by as much as 2:1 depending on variables such as interconnections in the water main and the season of the year. Because the design of an evaporator is dependent on the conductivity of the water in the vessel, it is necessary to ensure that the conductivity of the water in the vessel is maintained near the value for which the evaporator was designed or else tedious adjustments or adaptations of the evaporator will be necessary to accommodate different water conductivities.

Furthermore, because of the continual evaporation of water from the vessel, impurities from the water remain in the vessel and increase in concentration to the point where flushing of the vessel is necessary to reduce the contained water conductivity and mineral build-up on the electrodes. If flushing is carried out merely on a time basis, the water may be flushed when its conductivity is below the designed value. In any event, the loss of hot water from the system during flushing is likely to exceed that necessary to maintain the conductivity at the designed value.

Canadian Pat. No. 1,002,094 granted on Dec. 21, 1976 to Plascon A.G. discloses a system which deals with these problems by arranging for the conductivity of the water in the vessel to be maintained at a value which is considerably higher than the average conductivity of typical water sources. As water is boiled off, the conductivity in the vessel gradually rises to the optimum designed value.

The magnitude of the current between the electrodes is measured continuously and the actual time taken for the current to drop between two predetermined values is compared with the calculated time required for the current to drop between those two values when the conductivity of the water is at the designed value. If the actual time measured is shorter, some of the water is flushed from the vessel, as this represents an unacceptably high conductivity.

Thus, the prior method involves obtaining the rate of change of current flow to give an indication of the conductivity of the water in the vessel.

SUMMARY OF THE INVENTION

In contrast, the present invention involves a more direct technique for obtaining values for the conductivity in the vessel by making use of a probe which is independent of the steam generating electrodes. The probe is, preferably, formed of two spaced electrodes which derive a current dependent only on the conductivity of the water because all other parameters such as shape and spacing of electrodes, applied voltage and depth of immersion can be kept constant.

Thus, according to one aspect of the present invention, there is provided a water evaporator comprising an evaporator vessel having spaced electrodes arranged vertically in the vessel. A source of water is connected to the vessel to immerse the electrodes at least partly and a source of electrical power is connected across the electrodes whereby a current will flow between the electrodes. The current has a magnitude dependent on the depth of immersion of the electrodes in the water, the conductivity of the water and the applied voltage. Steam generated in the vessel by the current is conveyed into an air space the moisture content of which is to be controlled. A water inlet valve is controlled to maintain the water level in the vessel at or near a predetermined value. A probe measures the conductivity of the water in the evaporator vessel itself or in a separate sample vessel, and a control device connected to the probe is arranged to maintain the outlet valve open for a predetermined time when the conductivity measured by the probe exceeds a predetermined reference conductivity value.

In the operation of the evaporator, the conductivity of the water in the evaporator vessel is measured at intervals with the probe independent of the electrodes, and the conductivity measured is compared with a reference conductivity considerably higher than the conductivity level of the source of water. Thereafter a quantity of water is flushed out of the evaporator vessel with fresh water supplied from the source of water if the measured conductivity is higher than the reference conductivity.

BRIEF DESCRIPTION OF THE DRAWINGS

The invention will now be described in greater detail with reference to the accompanying drawing in which.

DESCRIPTION OF THE PREFERRED EMBODIMENT

Figure 1:
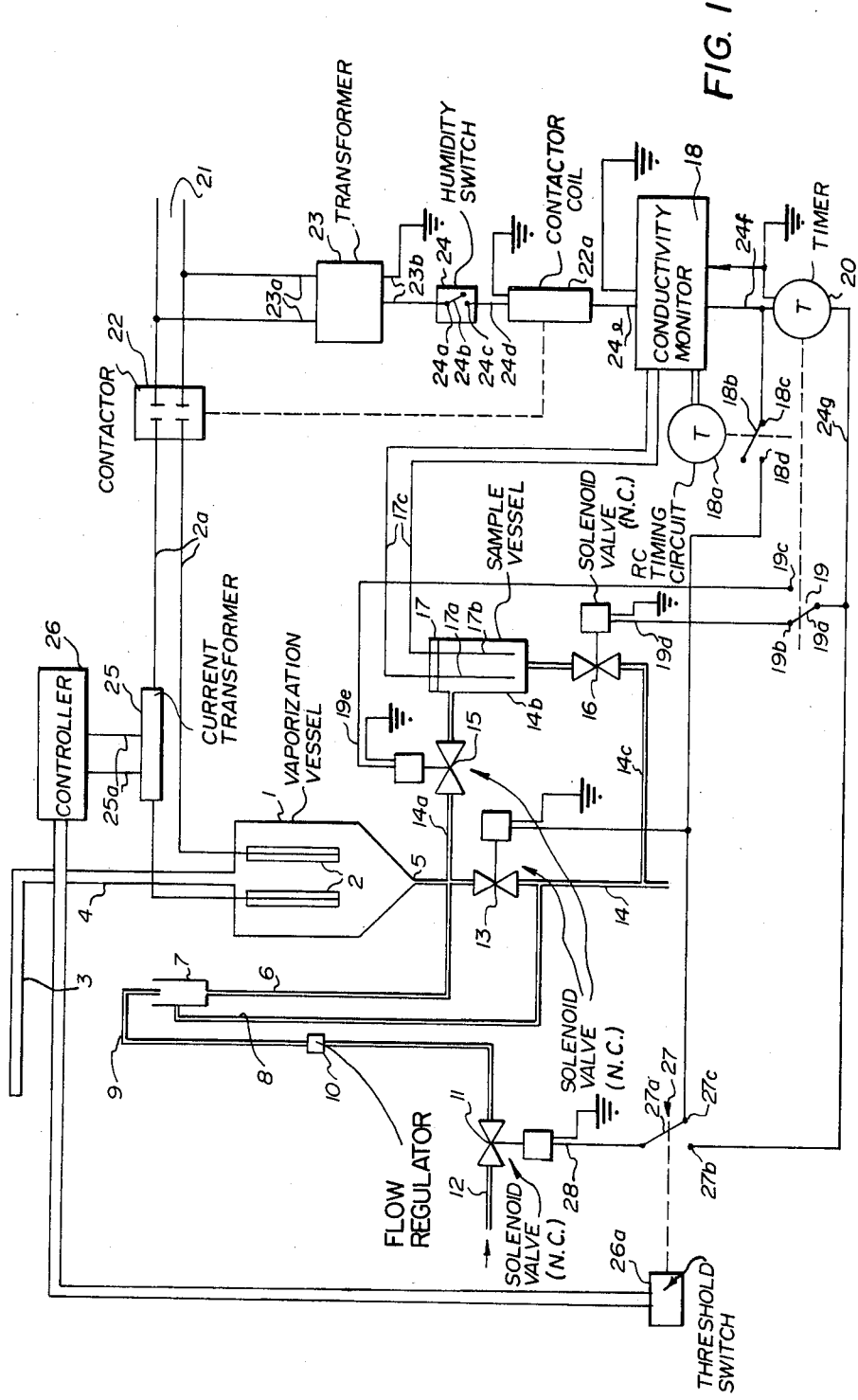
FIG. 1 is a schematic diagram of a first embodiment of the invention.

A humidifier according to the invention includes a vaporization container or vessel 1 constructed of a non-corrosive and non-conductive material and containing two (in this embodiment but there may be more) vertical spaced electrodes 2 constructed of a non-corrosive electrically conductive material. The electrodes are of constant cross-section throughout their height.

A steam distributor 3 formed as an apertured pipe located in a space, the moisture content or humidity of which is to be controlled, is connected by means of a vertical steam-carrying conduit 4 allowing the passage of steam from the interior of the vessel 1 through the top thereof.

An opening 5 at the bottom of the vessel 1 for filling and emptying the vessel is connected through a conduit 6 to the bottom of a fill vessel 7 exposed to the atmosphere. Near the top of the fill vessel is the entrance of an overflow pipe 8, the other end of which is connected to a drain 14 as described below. A conduit 9 has an outlet discharging into the vessel 7. A flow regulator or orifice 10 and a normally closed solenoid valve 11 are located between the discharge end of conduit 9 and the inlet end 12 which is connected to a source of liquid (not shown).

The drain 14 is a vertical conduit extending down from the opening 5 in the bottom of the vessel. The drain 14 is opened and closed by means of a normally closed solenoid valve 13. Downstream from this valve is the interconnection of drain 14 and overflow pipe 8. Also connected to the bottom opening 5 is a horizontally arranged bleed or sampling conduit 14a, the other end of which is connected into a small vertical sampling vessel 14b. A normally closed solenoid valve 15 is mounted in conduit 14a and a normally closed solenoid valve 16 is mounted in a conduit 14c which interconnects the bottom of the vessel 14b with the drain 14.

The sampling vessel 14b encloses a conductivity probe 17 comprising two spaced electrodes 17a and 17b which are connected by leads 17c to a conductivity monitoring device 18. The device 18 comprises a reference voltage source to which leads 17c are connected, a high signal selector or comparator in which a reference or threshold current is compared to the current derived in the leads 17c and an RC timing circuit 18a connected to the output of the comparator to provide a signal the duration of which is proportional to the amount by which the threshold current is exceeded. The timing circuit is preferably adjustable to vary the duration of the output signal to a suitable value. A contact 18b is powered by the timing circuit 18a, the contact 18b allowing connection of a normally open contact pair 18c and 18d. If the threshold current is higher, the timing circuit 18a is not energised.

A timer 20 is connected to a changeover switch 19 and is arranged to change switch 19 from a first condition to a second condition after a first time interval and from the second condition to the first condition after a second time interval. In this way the movable contact 19a of changeover switch 19 is moved from the position shown in which it engages a fixed contact 19b to the position in which it engages a fixed contact 19c and back again. Contacts 19b and 19c are connected through respective leads 19d and 19e to solenoid valves 16 and 15.

The electrodes 2 are connected to an electrical supply source 21 by means of leads 2a. A relay or a contactor 22 is located in the circuit between the electrodes 2 and the supply source 21 for interrupting supply to the electrodes 2, the contactor 22 being energisable through a transformer 23, the primary input 23a of which is connected across leads 2a.

The secondary output 23b of transformer 23 is connected to the holding coil 22a of the contactor 22 through a humidity sensitive switch 24 located in the space, the humidity of which is being controlled. When the humidity is below a predetermined level, a movable contact 24b moves from the position shown to one in which it bridges terminals 24a and 24c and supplies power to contactor holding coil 22a conductivity monitoring device 18 and timer 20 through leads 24d, 24e and 24f. Lead 24f is also connected to contact 18c, and a lead 24g from timer 20 is connected to movable contact 19a of switch 19 and a fixed contact 27b of a changeover switch 27 described below.

A current transformer 25 is powered through one of the leads 2a and has output leads 25a connected to the input of a current sensitive controller 26. The controller 26 is connected to a threshold switch 26a which incorporates the changeover switch 27. The controller 26 processes the signal from current transformer 25 and provides a control signal proportional to the electrode current. The threshold switch 26a is adjustable so that an upper threshold value and a lower threshold value can be fixed in it. When the current sensed increases above a predetermined maximum, causing the control signal to exceed the upper threshold value, the changeover switch is operated and when the current sensed falls below a predetermined minimum, causing the control signal to drop below the lower threshold value, the changeover switch is operated in the opposite sense. Thus, a movable contact 27a which is permanently connected through a lead 28 to the solenoid valve 11 is switchable between fixed contacts 27b and 27c the latter of which is connected to contact 18d.

Switch 27 supplies power through contact 27b to solenoid valve 11 when the current sensed by controller 26 falls below a predetermined minimum and will supply power through contact 27c so that solenoid valve 11 can be powered if switch 18b is closed.

With the above system connected into the water and power sources, operation of the system proceeds according to the following sequence of events. Assuming that the humidity of the space is lower than that desired, the switch contact 24b bridges contacts 24a and 24c thus causing transformer 23 to energise contactor 22 to supply power from the source 21 to electrodes 2. Furthermore, movable contact 27a is in engagement with contact 27b, since controller 26 senses a current below the predetermined minimum, causing solenoid valve 11 to be energised through lead 24g from the secondary side of transformer 23. Thus, water passes through valve 11, regulator 10, conduit 9, fill vessel 7, conduit 6 and opening 5 into vessel 1.

As the water level rises in vessel 1 and begins to engulf electrodes 2, current begins to pass between these electrodes at a magnitude proportional to the voltage of the source 21, the area of the electrodes covered by water, the size, shape and spacing of the electrodes, and the conductivity and volume of the water in the vessel. The heat generated by the current causes water in the vessel to boil, the steam generated passing upwardly through conduit 4 into distributor 3 where it is injected into the space being controlled.

The fill process continues until the water level in the vessel 1 reaches a depth which gives a current value, as sensed by the current transformer 25, greater than the predetermined maximum value set in the controller 26. When this value is exceeded the controller threshold switch 26a powers switch 27 so that movable contact 27a engages fixed contact 27c. This closes solenoid valve 11, dependent on switch 18b being open. Switch 18b will only close if conductivity in sample vessel 14b exceeds the predetermined design conductivity.

As the water in vessel 1 continues to boil, the water level drops and so the current magnitude also drops until the predetermined minimum value is detected by the current transformer 25 and controller 26 operates threshold switch 26a to move switch 27 back into the position in which contacts 27a and 27b are in engagement to reopen valve 11 and refill vessel 1. The process continues cycling as described above until the humidity sensitive switch 24 switches over when the set humidity level is arrived at to interrupt power to the contactor 22 and thus preventing power from reaching the electrodes 2.

At a predetermined time established by timer 20 and during the above sequence, the timer 20 powers switch 19 to engage contacts 19a and 19c to open solenoid valve 15 and close solenoid valve 16 for a predetermined time during which a fixed volume of water is bled from vessel 1 into sample vessel 14b where it will be in quiescent state. Since the level to which the electrodes 17a, 17b are immersed in the sample is set and the energising voltage for the probe 17 can be set, the current level derived in electrodes 17a and 17b is a measure of the conductivity of the sample. When the set time expires, switch 19 will return to the position engaging contacts 19a and 19b which supplies power to solenoid valve 16 so that the sample is drained off.

As the system is designed to operate efficiently using water having conductivity considerably higher than that of the water provided by the water source, the conductivity of the water sampled will be below the reference conductivity set in the device 18 at least for several cycles. However, as water is being boiled off, impurities in the water are left behind thus increasing the conductivity of the water in the vessel 1. Eventually the time arrives when the conductivity of the sampled water rises above the value set in the device 18.

At that point, the current in leads 17c exceeds the threshold value set in the comparator and the contact 18b is energised through the timer 18a for a predetermined length of time depending on the deviation from the set value. Thus, solenoid valve 13 is open during this time allowing some of the water in the vessel 1 to drain out through opening 5 and drain 14. During the time that valve 13 is open valve 11 is also open to lower the drainage or discharge liquid temperature.

The current between electrodes 2 will drop in proportion to the drop in level of the water in vessel 1 and as soon as the current drops below the value set in controller 26, the switch 27 is operated to supply power to solenoid valve 11 to re-fill the vessel 1 as before.

The partial flushing out of vessel 1 and refilling with fresh water reduces the conductivity of the water in vessel 1 to the value for which the system was designed.

Figure 2:
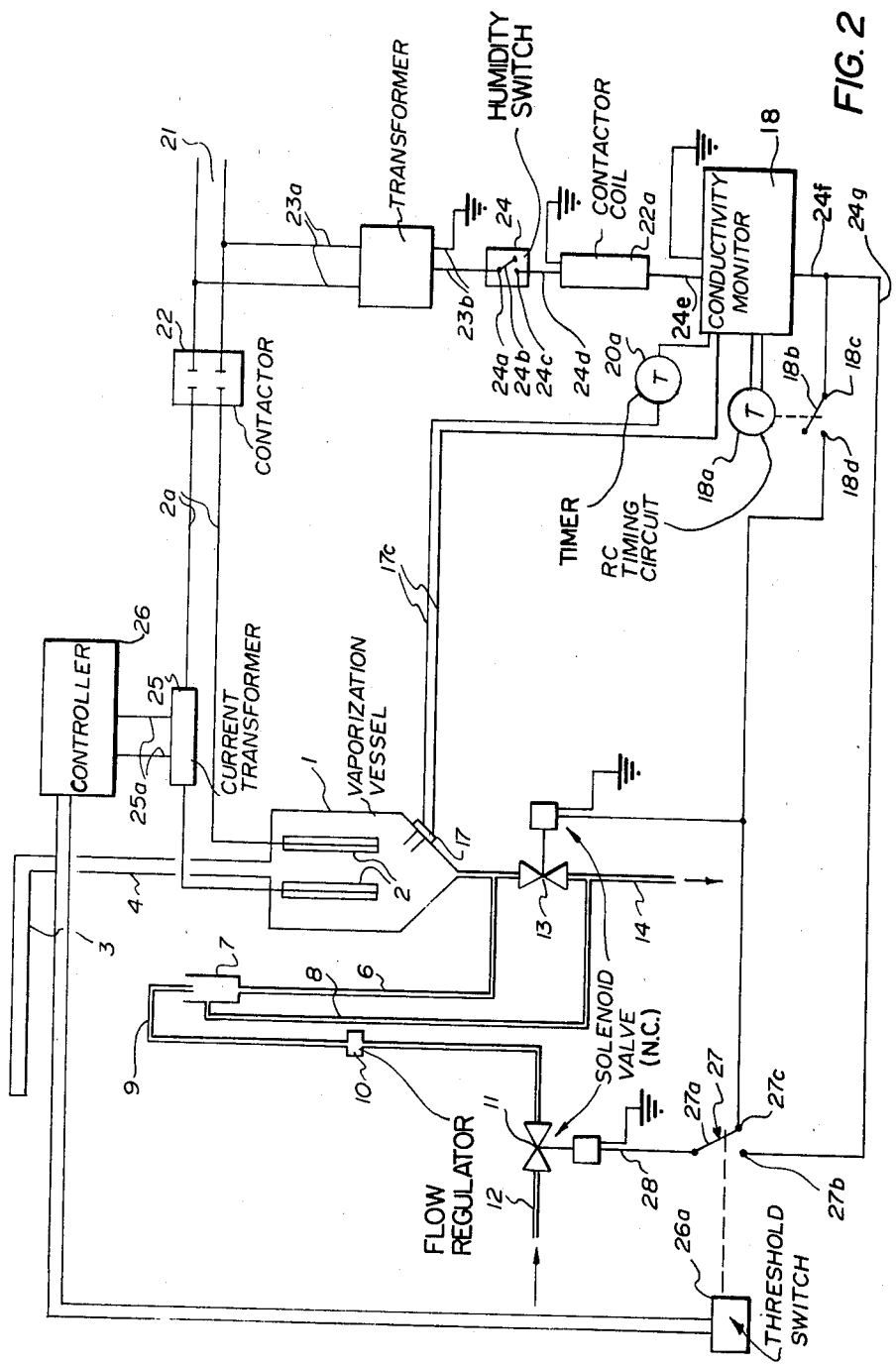
FIG. 2 is a schematic diagram of a second embodiment of the invention.

With reference to FIG. 2, the embodiment shown is similar to that illustrated in FIG. 1 except that conductivity probe 17 is located directly in vessel 1 rather than in a separate sampling vessel. Accordingly valves 15 and 16 and switch 19 of FIG. 1 are not required. Also, instead of timer 20, a timer 20a is incorporated in one of the lines 17c so as to energise conductivity probe 17 at predetermined intervals.

The operation of this embodiment is similar to that of the system of FIG. 1 except that after predetermined times established by the timer 20a the conductivity of the water measured by the probe 17 is compared in monitoring device 18 with a preset value and if this value is exceeded, the contact 18b is energised through the timing circuit 18a so that solenoid valve 11 and solenoid valve 13 open for a predetermined time thus causing some of the water in vessel 1 to drain away. Thus, as with the first embodiment, the conductivity of the water in the vessel can be maintained reasonably constant.

It should be appreciated that the conductivity of the water decreases with the water temperature and that the conductivity of the water at boiling point is the criterion of importance. If conductivity measurements are made at points where the water has not reached full temperature, then lower than actual conductivity will be sensed. This simply delays a possible drain sequence by one more cycle allowing the water to reach full boil for the next sample.

Although the invention has been described in two embodiments which control the water level in the vessel by monitoring the current between the electrodes 2, it is envisaged that the invention is applicable also where the water level is controlled by other means such as mechanical or electrically operated float valves.

What I claim as my invention is:

1. A water evaporator comprising an evaporator vessel, spaced electrodes arranged vertically in the vessel, means including inlet valve means for connecting a source of water to the vessel to immerse the electrodes at least partly, means for connecting a source of electrical power across the electrodes whereby a current will flow between the electrodes, the current having a magnitude dependent on the depth of the immersion of the electrodes in the water, the conductivity of the water and the applied voltage, means communicating with the interior of the vessel for conveying steam generated in the vessel by the current into an air space the moisture content of which is to be controlled, means for controlling the inlet valve means to maintain the water level in the vessel at or near a predetermined value, drain means for said vessel including a normally closed outlet valve means, probe means for measuring the conductivity of the water in the vessel during operation of the evaporator and with the outlet valve means closed, control means connected to the outlet valve means and responsive to the conductivity sensed by the probe means and including means, operative in response to the conductivity measured by the probe means exceeding a predetermined reference conductivity value, to open and maintain the outlet valve means open for a length of time directly dependent on the amount by which the measured conductivity exceeds the predetermined value, and timing means connected and arranged to cause said probe means to measure the conductivity of the water in the vessel at predetermined intervals during operation of the evaporator.

2. A water evaporator according to claim 1, including a sample vessel connected to an outlet of the evaporator vessel, the probe means being contained in the sample vessel, sample vessel valve means, timing means connected to the sample vessel valve means and arranged to operate the sample vessel valve means at intervals to fill the sample vessel with samples of the water in the evaporator vessel.

3. A water evaporator according to claim 2, in which the sample vessel valve means comprises an inlet valve and an outlet valve, the timing means being arranged to close the outlet valve and open the inlet valve and after a predetermined time open the outlet valve.

4. A water evaporator according to claim 1, in which the means for maintaining the water level in the vessel at a predetermined value comprises current detecting means connected electrically with the electrodes to measure the current passed between the electrodes and threshold means operable to open the inlet valve means when the current detected drops below a predetermined minimum value and to close the inlet valve means when the current detected rises above a predetermined maximum value.

5. A water evaporator according to claim 1, in which the probe means is contained in the evaporator vessel.

6. A water evaporator according to claim 1 in which the probe means comprises two further spaced electrodes connected to a voltage source and deriving a current dependent on the voltage, the cross-section of the further electrodes immersed and the conductivity of the water.

7. A water evaporator according to claim 6 in which the control means comprises comparator means comparing the current derived between the two further spaced electrodes with a reference current indicative of the predetermined reference conductivity value, a timing circuit connected to an output of the comparator means to provide an output signal the duration of which is directly proportional to the amount by which the reference current is exceeded, and switch means energised by the timing circuit to open the outlet valve means for the duration of said output signal.

8. A water evaporator according to claim 7, in which the switch means is also connected to open the inlet valve means when energised by the timing circuit for the duration of said output signal.

9. A water evaporator according to claim 1, in which the control means connected to the outlet valve means is also connected to the inlet valve means and is arranged to maintain the inlet valve means open while the outlet valve means is open.

10. A water evaporator according to claim 1 in which the probe means comprises two further spaced electrodes connected to a voltage source and deriving a current dependent on the voltage, the cross-section of the further electrodes immersed and the conductivity of the water, and in which the control means comprises comparator means comparing the current derived between the two further spaced electrodes with a reference current indicative of the predetermined reference conductivity value, a timing circuit connected to an output of the comparator means to provide an output signal the duration of which is directly proportional to the amount by which the reference current is exceeded, and switch means energized by the timing circuit to open the outlet valve means for the duration of said output signal.

11. A method of operating a water evaporator having an evaporator vessel, spaced electrodes arranged vertically in the vessel, means for connecting a source of water to the vessel to immerse the electrodes at least partly, means for connecting a source of electrical power across the electrodes whereby a current will flow between the electrodes, the current having a magnitude dependent on the depth of immersion of the electrodes in the water, the conductivity of the water and the applied voltage, means communicating with the interior of the vessel for conveying steam generated in the vessel by the current into an air space the moisture content of which is to be controlled, the method comprising measuring automatically at predetermined intervals the conductivity of the water in the evaporator vessel with probe means independent of the electrodes, comparing the conductivity measured with a reference conductivity considerably higher than the conductivity level of the source of water, determining the amount by which the measured conductivity exceeds the reference conductivity and flushing out a quantity of water from the evaporator vessel with fresh water from the source of water only if the measured conductivity is higher than the reference conductivity and in an amount directly dependent on the amount by which the measured conductivity exceeds said predetermined conductivity.

* * * * *